United States Patent Office 3,136,823
Patented June 9, 1964

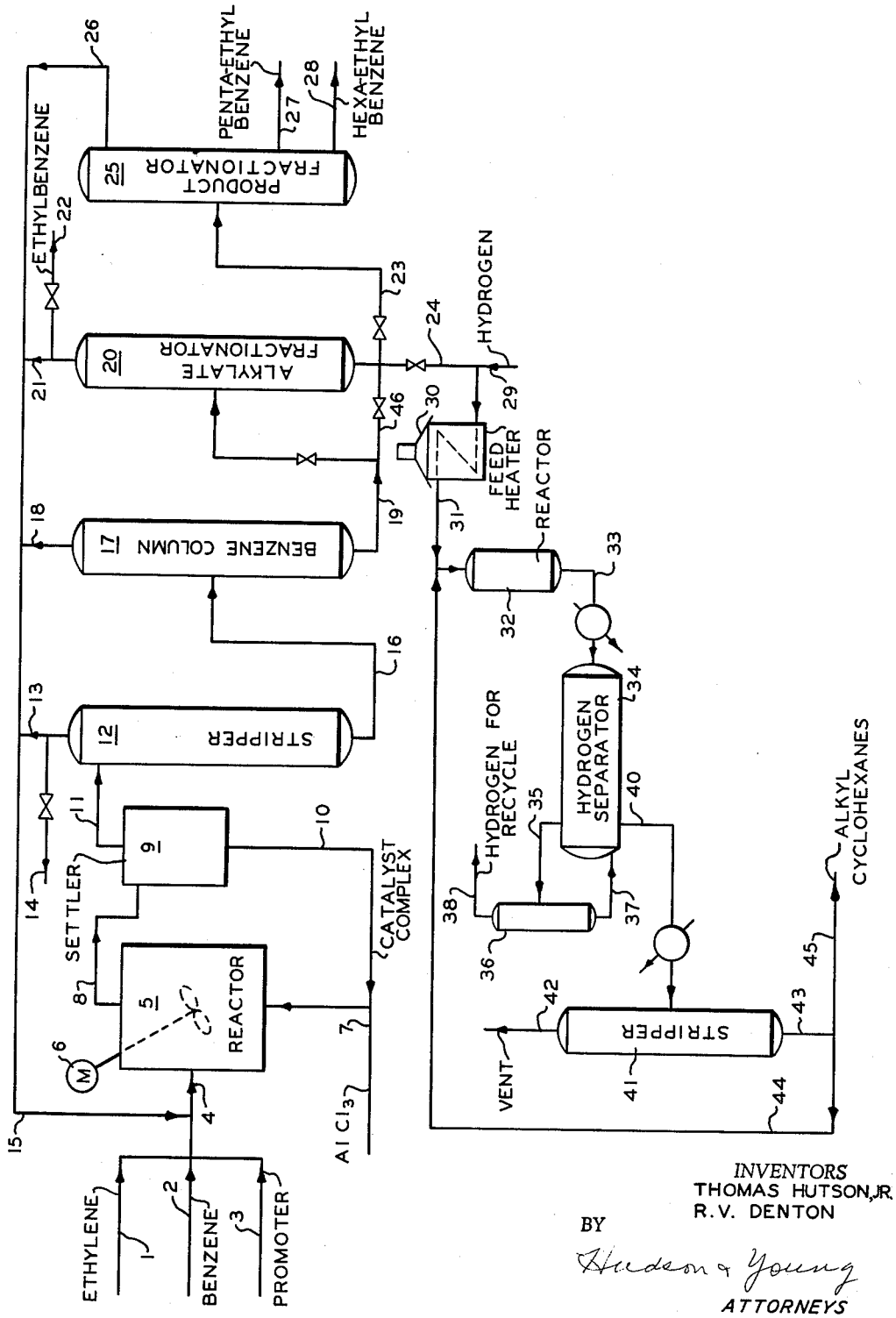

3,136,823
POLY-ETHYL BENZENES AND THEIR
DERIVATIVES
Thomas Hutson, Jr., and Roy V. Denton, Bartlesville, Okla., assignors to Phillips Petroleum Company, a corporation of Delaware
Filed Feb. 20, 1961, Ser. No. 90,558
16 Claims. (Cl. 260—667)

This invention relates to process and apparatus for preparation of poly-ethyl benzenes. In one aspect, this invention relates to a process and apparatus for catalytically preparing penta- and hexa-ethyl benzenes in improved yield. In another aspect, this invention relates to a process and apparatus for preparation of hydrogenated penta- and hexa-ethyl benzenes. In still another aspect, this invention relates to a high-energy liquid fuel composition and a process and apparatus for producing the same. In yet another aspect, this invention relates to a process and apparatus for alkylation of benzene.

Alkylation of benzene has, in the past, resulted in relatively high yield of the lower-substituted benzenes. That is, the alkylation of benzene normally results in a relatively high yield of the mono-alkyl and di-alkyl substituted benzenes, as compared to the penta- and hexa-alkyl benzenes.

We have now found that the higher polyalkylates will be formed in high yields if an aluminum chloride catalyst is promoted with a very low concentration of HCl in the range of about 0.01 to about 0.05 percent by weight of the reaction mixture, and, preferably, in the range of about 0.015 to about 0.03 percent. The concentration of the HCl present as promoter should be determined as total HCl present, regardless of the source of the HCl. As examples of sources, the HCl may be added as such, or it may be obtained by hydrolysis of the aluminum chloride by water present in the system or added for the purpose, or by reaction or decomposition of chlorine compounds, such as mono- or dichlorobenzene. Hydrolysis of the aluminum chloride is a convenient method of obtaining the promoter in low concentration, especially since some moisture is very likely present in the hydrocarbon feedstream. The use of this promoter in amounts smaller than used before results, as has been stated, in a higher yield of the more completely alkylated benzenes. We have also found that these more completely alkylated benzenes, when hydrogenated, are useful for example as high energy missile fuels.

It is an object of this invention to provide process and apparatus for the preparation of penta- and hexa-ethyl benzenes. It is another object of this invention to provide catalytic process wherein high yields of penta- and hexa-ethyl benzenes are obtained by use of a catalyst promoter. It is another object of this invention to provide process and apparatus for the hydrogenation of a stream comprising penta- and hexa-ethyl benzenes. It is still another object of this invention to provide a high-energy liquid fuel composition. It is yet another object of this invention to provide a novel method and apparatus for alkylation of benzene, and for preparation of a novel hydrogenated alkylate.

Other aspects, objects and advantages will be apparent to one skilled in the art upon study of the disclosure, attached drawing, and the appended claims.

According to the invention, we have provided a process and apparatus for preparing alkylated benzenes which comprises admixing ethylene and benzene, agitating the mixture in the presence of aluminum chloride catalyst and a promoter in a reaction zone, said promoter comprising hydrogen chloride and said hydrogen chloride being present in the range of about 0.01 to about 0.05 weight percent of the total reaction mixture, withdrawing the resulting mixture from said reaction zone, allowing the withdrawn mixture to separate into a hydrocarbon phase and a catalyst phase, and separating from the hydrocarbon phase an alkylate product. There is further provided a process and apparatus for hydrogenation of the product to the corresponding saturated hydrocarbons. There is further provided a high-energy liquid fuel composition comprising the thus-produced alkylated cyclohexanes.

In order to more fully understand the invention, reference is now made to the attached drawing. Ethylene, benzene, and a promoter, such as hydrogen chloride, are provided through conduits 1, 2, and 3, respectively. These feedstreams are passed by way of conduit 4 to an alkylation reactor 5 provided with a stirrer and motor represented at 6. A catalyst, such as aluminum chloride, is introduced to the reactor by way of conduit 7. After suitable residence time, the alkylation effluent is withdrawn from reactor 5 by way of conduit 8, and introduced to a settler 9, wherein the effluent is allowed to settle into a hydrocarbon phase and a catalyst complex phase. The catalyst complex phase can be withdrawn by way of conduit 10 and returned to the reactor by being introduced again into conduit 7. The hydrocarbon phase is removed from settler 9 by way of conduit 11 and passed to a stripper 12. Here, lighter components present in the reaction effluent are withdrawn by way of conduit 13. These components will comprise principally ethylene, and may be withdrawn by way of conduit 14 and its associated valve for further utility, or may be recycled to the reactor by way of conduit 15. The stripped reaction effluent is then sent by way of conduit 16 to a benzene column 17, wherein principally unreacted benzene is removed from the effluent. This unreacted benzene can be recycled by way of conduits 18 and 15 to the reactor. The remainder of the alkylation mix is passed by way of conduit 19 to an alkylate fractionator 20, wherein it is separated into streams comprising penta- and hexa-ethyl benzene and lower alkyl benzenes. The lower alkyl benzene stream is withdrawn by way of conduit 21 and can be recycled by way of conduit 15 to the reactor for further alkylation or can be withdrawn by way of conduit 22 and its associated valve for further utility. The penta- and hexa-ethyl benzene stream can be passed by way of conduit 23 and its associated valve to product fractionator 25, wherein it is further separated and purified. A stream of penta-ethyl benzene can be withdrawn by way of conduit 27 and a stream of hexa-ethyl benzene withdrawn by way of conduit 28. Any lighter components present at this point can be recycled by way of conduits 26 and 15 to reactor 5. A portion of the heavy alkylate stream from fractionator 20 can be passed by way of conduit 24 to a feed heater 30. Hydrogen is admixed with this stream by way of conduit 29. The resulting heated admixture is passed by way of conduit 31 to a reactor 32 containing a hydrogenation catalyst. After hydrogenation, the resulting mixture is passed by way of conduit 33 and its associated cooler to a hydrogen separator 34. Here, the hydrogen effluent is separated, for example, by way of passing through conduit 35 to separator 36. The liquid hydrogenation effluent is passed by way of conduit 37 back to separator 34, while the gases from the separation, principally hydrogen, are passed by way of conduit 38 and can be recycled to conduit 29. The remaining hydrogenation effluent is passed by way of conduit 40 and its associated heater to a stripping zone 41, wherein any remaining gases are vented by way of conduit 42. Liquid is withdrawn from this stripper by way of conduit 43, and comprises penta- and hexa-ethyl cyclohexane. This material can be withdrawn by way of conduit 45 for further utility, such as a high-energy missile fuel component, or can be recycled by way of conduit 44 for further hydrogenation in reactor 32.

In another embodiment, the entire alkylate stream, preferably after removal of catalyst and unreacted ethylene and benzene, is passed by way of conduits 19 and 46 directly to conduit 24. The entire alkylate is then hydrogenated as previously described, resulting in a stream comprising ethyl cyclohexane and various isomers of the di- to hexa-ethyl cyclohexanes. This material is again useful as a high-energy fuel.

The following example will further serve to illustrate a specific embodiment of our invention.

*Example I*

The alkylation system shown in the figure was operated on a continuous basis so as to produce 5.75 pounds per hour of ethyl benzene of a purity of 99+ percent and 3.85 pounds per hour of mixed penta- and hexa-ethyl benzene. The feed to the system consisted of 5.24 pounds per hour of benzene, 4.35 pounds per hour of ethylene and 0.6 pound per hour of anhydrous $AlCl_3$. Initially, operation was started with an $AlCl_3$ catalyst complex containing between 27 and 37 weight percent $AlCl_3$. The recycled complex contained between 27 and 37 weight percent $AlCl_3$, the remainder being benzene and heavy hydrocarbon oils; viscosity of this complex was in the range of 5 to 20 centipoises. No HCl promoter was added as such, but the moisture content of the combined feed streams was such as to maintain the concentration of HCl in the reactor at 0.02 percent by weight, through hydrolysis of $AlCl_3$.

A temperature of 159° F. and a pressure of 18 p.s.i.g. were maintained in the reactor, and vigorous agitation was provided by means of an impeller stirrer.

The reaction product was passed from the reactor to a settler where the aluminum chloride catalyst complex was removed and recycled to the reactor at the rate of 15.8 gallons per hour. The alkylate mixture was then neutralized with 20 percent KOH and fractionated to remove benzene which was recycled at the rate of 49.36 pounds per hour. Any inert gaseous materials were removed from the overhead of this column. The stripped alkylate was then fractionated into a practically pure ethyl benzene overhead (5.75 pounds per hour) and a bottoms fraction of poly-ethyl benzenes. The latter stream had the following composition:

| | Weight percent |
|---|---|
| Benzene | 0.7 |
| Ethyl benzene | 2.5 |
| 1,3-diethyl benzene | 0.7 |
| 1,4-diethyl benzene | 29.1 |
| 1,2-diethyl benzene | 17.2 |
| 1,3,5-triethyl benzene | 3.0 |
| 1,2,4-triethyl benzene | 12.2 |
| 1,2,3-triethyl benzene | 0.2 |
| 1,2,4,5-tetraethyl benzene | Trace |
| 1,2,3,5-tetraethyl benzene | 7.2 |
| 1,2,3,4-tetraethyl benzene | 0.3 |
| Penta-ethyl benzene | 12.2 |
| Hexa-ethyl benzene | 10.3 |
| Heavy | 4.3 |
| | 100.0 |

This stream was fractionated into a bottoms product of 3.85 pounds per hour of mixed penta- and hexa-ethyl benzenes, together with a small amount of "heavies," and an overhead stream containing benzene and the lower-substituted ethyl benzenes; the overhead stream was recycled to the alkylation zone.

*Example II*

In a further example, the penta- and hexa-ethyl benzene stream from the preceding example is hydrogenated by being admixed with 9 mols of hydrogen per mol of hydrocarbon. Hydrogenation is over a supported nickel catalyst at maximum temperature of about 450° F. The space velocity is about 0.5 to about 3.0 LHSV. After separation of unreacted hydrogen, the resulting penta- and hexa-ethyl cyclohexane can be used straight or blended with JP-4 fuel, for example, to obtain the required density and viscosity as a jet or missile fuel.

*Example III*

A series of runs was carried out in a stirred tank alkylation reactor at 160° F. using aluminum chloride catalyst complex. The reactor effluent was allowed to settle, and the catalyst complex was recycled to the reactor in a volume about equal to the total hydrocarbon charge. The mol ratio of benzene to ethylene was about 4.4:1. Variations in the amount of hydrogen chloride promoter yielded the following results:

| Weight percent HCl promoter | Weight percent net yield of poly-ethyl benzene | Weight percent penta- and hexa-ethyl benzene in poly-ethyl benzene recycle |
|---|---|---|
| 0.41 | 0 | 0.9 |
| 0.21 | 2.0 | 1.7 |
| 0.05 | 33.7 | 20.5 |
| 0.02 | 40.0 | 23.2 |

In the synthesis of relatively pure products, it is advantageous to employ benzene and ethylene feedstocks of relatively high purity and/or substantially free of components capable of interfering in any of the subsequent separation steps. Benzene feedstocks may ordinarily be provided in substantially pure form and the efficiency of conversion to ethyl benzenes makes this practice economical. The benzene feed may contain cycloparaffin or paraffin impurities which are substantially inert in the alkylation step. These materials are continuously or intermittently withdrawn from the system through treatment or segregation of the benzene recycle stream.

The ethylene feed stream may be obtained from any suitable source such as thermal or catalytic cracking of hydrocarbon oil or gases, the dehydration of ethyl alcohol, etc. The present process is particularly well adapted to the utilization of ethylene-containing fractions without extensive purification, although higher olefins are usually removed to prevent concurrent reaction over the alkylation catalyst, and the production of complex alkylate mixtures. When ethylene-ethane stocks are available for the process, the ethane is readily removed from the effluent of the alkylation zone after utilization of the ethylene by flashing and/or stripping. In such circumstances, it is highly desirable to obtain substantially complete ethylene utilization to avoid compression and recycling of a lean ethylene stream after the alkylation step.

The benzene and ethylene feed streams are ordinarily combined in proportions which give a predetermined benzene-ethylene molar ratio in the alkylation zone. The presence of excess benzene favors more complete ethylene utilization, but at the same time limits the extent of polyalkylation over most catalysts; however, with the special catalyst systems described below, the advantages of high ethylene utilization and high conversion to polyalkylates may both be realized. An operable range of benzene-ethylene molar ratios is from 2:1 to 8:1, a preferred range is about 4.5:1.

The reactants and catalyst may all be added directly to the alkylation reactor where a stirrer will provide adequate mixing, or they may be premixed in any desired combination or order.

The alkylation reaction may be carried out at a temperature in the range 135 to 185° F., preferably 155 to 165° F. The pressure in the reactor will be sufficient to maintain all reactants in the liquid phase, and generally will be in the range of 18 p.s.i.g. to 58 p.s.i.g.

Aluminum trichloride is the catalyst which is preferred for use in our invention. In general, liquid hydrocarbon-aluminum chloride catalysts are prepared by reacting a relatively pure and anhydrous aluminum chloride with a paraffin hydrocarbon at a temperature in the range of 150 to 230° F. Satisfactory fluid complexes have been prepared from a variety of paraffin hydrocarbons including normal heptane, isooctane, a paraffinic alkylate fraction resulting from reaction of isobutane and butylenes, and boiling above 350° F., kerosene, etc. An essential requirement for the preparation of a good catalyst appears to be the use of a sufficiently powerful mixing to maintain the aluminum chloride and the hydrocarbon in intimate contact during the period in which the catalyst is being prepared. Two general types of catalyst have been prepared—high aluminum chloride and low aluminum chloride. The high aluminum chloride type contains 80 to 85 percent by weight of aluminum chloride, and is a yellow, highly viscous material. The low aluminum chloride type contains about 55 percent aluminum chloride, and is a fluid red-brown oil having a viscosity less than 200 centistokes at 100° F. The high aluminum chloride type can be added during a continuous run in small amounts to the recirculated catalyst in order to maintain catalyst activity. Catalyst activity, however, can be maintained in other ways as by adding aluminum chloride directly to recirculated catalyst or by dissolving aluminum chloride in one of the streams charged to the reaction zone.

Any of the conventional aluminum halide complex alkylation catalysts which are capable of promoting complete and selective alkylation with ethylene may be used in the present process. Thus, while aluminum chloride in conjunction with a hydrogen chloride promoter are described, there is also contemplated the use of aluminum bromide and iodide catalysts, as well as hydrogen bromide and iodide promoters. It is further preferred, for the sake of maintaining a simple system, to use a catalyst and promoter of the same halide, so that any catalyst hydrolysis will produce the corresponding promoter.

Reasonable variation and modification are possible within the scope of this disclosure, the drawing and the appended claims to this invention, the essence of which is that there is provided a process and apparatus for preparation of alkylated benzene and/or cyclohexane wherein a hydrogen chloride alkylation promoter is used in an amount between about 0.01 and about 0.05 weight percent of the total alkylation reaction mixture.

We claim:

1. A process for preparing polyethyl benzenes comprising admixing ethylene and benzene; agitating the mixture in a reaction zone in the presence of aluminum halide catalyst and a promoter comprising hydrogen halide, said hydrogen halide being present in the range of about 0.01 to about 0.05 weight percent of the total reaction mixture; withdrawing the resulting mixture from said reaction zone; allowing the withdrawn mixture to separate into a hydrocarbon phase and a catalyst phase; and withdrawing said separated hydrocarbon phase.

2. The process of claim 1 wherein said polyethyl benzenes are hydrogenated to produce polyethyl cyclohexanes.

3. A process for preparing polyethyl cyclohexanes comprising admixing ethylene and benzene; agitating the mixture in a reaction zone in the presence of aluminum halide catalyst and a promoter comprising hydrogen halide, said hydrogen halide being present in the range of about 0.01 to about 0.05 weight percent of the total reaction mixture; withdrawing the resulting mixture from said reaction zone; allowing the withdrawn mixture to separate into a hydrocarbon phase and a catalyst phase; returning a portion of said catalyst phase to said reaction zone; withdrawing said hydrocarbon phase; and hydrogenating a portion of the withdrawn hydrocarbon phase.

4. The process of claim 3 wherein said portion of the withdrawn hydrocarbon phase comprises penta- and hexa-ethyl benzenes.

5. The process of claim 3 wherein said portion of the withdrawn hydrocarbon phase comprises a member chosen from the group consisting of penta-ethyl benzene and hexa-ethyl benzene.

6. The process of claim 3 wherein said aluminum halide catalyst is prepared by reacting aluminum chloride with a hydrocarbon at a temperature in the range of about 150 to about 230° F. to obtain a catalyst complex containing about 80 to about 85 weight percent aluminum chloride.

7. The process of claim 3 wherein said aluminum halide catalyst is prepared by reacting aluminum chloride with a hydrocarbon at a temperature in the range of about 150 to about 230° F. to obtain a catalyst complex containing about 55 weight percent aluminum chloride.

8. A process for preparing penta- and hexa-ethyl cyclohexanes comprising introducing into a reaction zone ethylene, benzene, aluminum chloride catalyst, and hydrogen chloride promoter in an amount sufficient to provide said hydrogen chloride in the range of about 0.01 to about 0.05 weight percent of the total reaction mixture; admixing in said reaction zone the introduced streams; withdrawing from said reaction zone the resulting reaction mixture allowing the withdrawn mixture to separate into a hydrocarbon phase and a catalyst phase; returning a portion of said catalyst phase to said reaction zone; passing said hydrocarbon phase to a stripping zone wherein unreacted ethylene is removed from said hydrocarbon phase and returning a portion of the removed ethylene to said reaction zone; withdrawing from said stripping zone the remainder of said hydrocarbon phase and passing the same to a separation zone wherein unreacted benzene is separated therefrom; returning a portion of said unreacted benzene to said reaction zone; withdrawing the resulting stream from said separation zone and introducing same into a second separation zone wherein it is separated into a stream comprising penta- and hexa-ethyl benzenes and a stream comprising lower ethyl benzenes; withdrawing as a product of the process said stream comprising lower ethyl benzenes; withdrawing said stream comprising penta- and hexa-ethyl benzenes; and hydrogenating the latter said stream.

9. A process for producing polyethyl benzenes comprising reacting ethylene and benzene in the presence of aluminum halide catalyst and hydrogen halide promoter, said promoter being present to the extent of about 0.01 to about 0.05 weight percent of the total reaction mixture, and recovering from the reaction mixture a product comprising penta- and hexa-ethyl benzenes.

10. The process of claim 9 wherein the reaction is maintained at about 135 to 185° F. and at a pressure sufficient to maintain liquid phase.

11. The process of claim 10 wherein the mol ratio of benzene to ethylene fed to the reaction is between about 2:1 to about 8:1.

12. The process of claim 9 wherein the reaction is maintained at about 155 to about 165° F. and about 32 to about 72 p.s.i.a., and wherein the mol ratio of benzene to ethylene fed to the reaction zone is about 4.5:1.

13. The process of claim 12 wherein said promoter is present to the extent of about 0.015 to about 0.03 weight percent of the total reaction mixture.

14. The process of claim 9 wherein said aluminum halide catalyst is prepared by reacting aluminum halide with a hydrocarbon at a temperature in the range of about 150 to about 230° F. to obtain a catalyst complex containing about 80 to about 85 weight percent aluminum halide.

15. The process of claim 9 wherein said aluminum halide catalyst is prepared by reacting aluminum halide with a hydrocarbon at a temperature in the range of about 150 to about 230° F. to obtain a catalyst complex containing about 55 weight percent aluminum halide.

16. A process for producing polyalkyl benzenes comprising reacting an olefin and benzene in the presence of aluminum halide catalyst and hydrogen halide promoter, said promoter being present to the extent of about 0.01 to about 0.05 weight percent of the total reaction mixture, and recovering from the reaction mixture a product comprising penta- and hexa-alkyl benzenes.

References Cited in the file of this patent

UNITED STATES PATENTS

| | | |
|---|---|---|
| 2,459,636 | Fenney | Jan. 18, 1949 |
| 2,498,567 | Morris et al. | Feb. 21, 1950 |
| 2,519,099 | Bailey et al. | Aug. 15, 1950 |
| 2,550,413 | Gislon | Apr. 24, 1951 |
| 2,979,546 | Grandio et al. | Apr. 11, 1961 |